US012574880B2

(12) United States Patent     (10) Patent No.:   US 12,574,880 B2

Fu et al.     (45) Date of Patent:    Mar. 10, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Bin Liang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 405 days.

(21) Appl. No.: 18/128,482

(22) Filed: Mar. 30, 2023

(65) Prior Publication Data

US 2023/0239822 A1     Jul. 27, 2023

Related U.S. Application Data

(63) Continuation of application No. PCT/CN2020/119649, filed on Sep. 30, 2020.

(51) Int. Cl.
    *H04W 56/00*      (2009.01)

(52) U.S. Cl.
    CPC .............................. *H04W 56/0045* (2013.01)

(58) Field of Classification Search
    CPC ......... H04W 72/1242; H04W 72/1268; H04W 72/1289; H04W 72/12; H04W 72/10; H04W 52/08; H04W 52/146; H04W 52/325; H04W 52/362; H04W 52/367; H04W 52/54; H04W 72/044; H04W 72/23; H04W 52/32; H04W 72/04; H04W 56/004; H04W 56/0045; H04W 56/0055; H04L 5/00; H04L 1/1861; H04L 1/1864; H04L 5/0053; H04L 5/0091; H04L 1/00
See application file for complete search history.

(56) References Cited

U.S. PATENT DOCUMENTS

| | | | |
|---|---|---|---|
| 8,837,307 B2 | 9/2014 | Ekbal et al. | |
| 11,838,151 B1* | 12/2023 | Jones .................. | H04L 25/0224 |
| 2011/0292819 A1* | 12/2011 | Ekbal .................... | G01S 13/765 |
| | | | 370/252 |
| 2019/0116568 A1* | 4/2019 | Fertonani .............. | H04W 56/00 |
| 2020/0252424 A1 | 8/2020 | Regev | |
| 2021/0219253 A1* | 7/2021 | Van Phan ........... | H04W 56/004 |
| 2022/0039045 A1* | 2/2022 | Sun .................. | H04W 56/0045 |

(Continued)

FOREIGN PATENT DOCUMENTS

| | | |
|---|---|---|
| CN | 101848414 A | 9/2010 |
| CN | 108988972 A | 12/2018 |

(Continued)

OTHER PUBLICATIONS

Extended European Search Report issued in corresponding European application No. 20955780.0, mailed Oct. 10, 2023.

(Continued)

*Primary Examiner* — Nathan S Taylor

(74) *Attorney, Agent, or Firm* — BAYES PLLC

(57)      ABSTRACT

A wireless communication method includes: performing, by a terminal device, a related operation used for propagation delay compensation (PDC) in response to that a first PDC execution condition is satisfied.

15 Claims, 5 Drawing Sheets

(56) References Cited

U.S. PATENT DOCUMENTS

| | | | | |
|---|---|---|---|---|
| 2022/0322127 A1* | 10/2022 | Sha | ........................ | H04W 24/10 |
| 2023/0262635 A1* | 8/2023 | Tan | ................... | H04W 56/0045 |
| | | | | 370/350 |

FOREIGN PATENT DOCUMENTS

| | | | | |
|---|---|---|---|---|
| CN | 111247836 A | 6/2020 | | |
| CN | 111565083 A | 8/2020 | | |
| WO | 2020031113 A1 | 2/2020 | | |
| WO | WO-2020034344 A1 * | 2/2020 | ............... | H04L 1/08 |
| WO | WO-2020077577 A1 * | 4/2020 | | |
| WO | 2020093000 A1 | 5/2020 | | |
| WO | 2020167013 A1 | 8/2020 | | |

OTHER PUBLICATIONS

Source: CMCC; Title: Remaining Issues for Propagation Delay Compensation; 3GPP TSG-RAN WG2 #109 R2-2001426 Athens, GR, Feb. 24-28, 2020.
Source: vivo; Title: Propagation delay compensation for reference time; 3GPP TSG-RAN WG2 Meeting #108 R2-1914959 Reno, USA, Nov. 18-22, 2019.
Source: vivo; Title: Discussion on propagation delay compensation in rel-16; 3GPP TSG-RAN WG2 Meeting #109-e R2-2000490 Electronic Meeting, Feb. 28-Mar. 6, 2020.
CATT, "Remaining Issues on Propagation Delay Compensation", R2-2000110, 3GPP TSG-RAN WG2 Meeting #109 electronic Elbonia, Feb. 24-Mar. 6, 2020.
Vivo, "Propagation delay compensation for reference time", R2-1905759, 3GPP TSg-RAN WG2 Meeting #106 Reno, USA, May 13-May 17, 2019.
International Search Report issued in international application No. PCT/CN2020/119649, mailed Jun. 24, 2021.
Written Opinion of the International Searching Authority issued in international application No. PCT/CN2020/119649, mailed Jun. 24, 2021.
Huawei, "Draft LS on propagation delay compensation enhancements", R1-20xxxxx, 3GPP TSG RAN WG1 Meeting #102-e e-Meeting, Aug. 17-28, 2020.
3GPP TS 38.215 V17.1.0 (Mar. 2022); Technical Specification Group Radio Access Network; NR; Physical layer measurements (Release 17).
3GPP TS 38.300 V17.0.0 (Mar. 2022); Technical Specification Group Radio Access Network; NR; NR and NG-RAN Overall Description; Stage 2 (Release 17).
3GPP TS 38.331 V17.0.0 (Mar. 2022); Technical Specification Group Radio Access Network; NR; Radio Resource Control (RRC) protocol specification (Release 17).
Notice of First Office Action issued in corresponding Chinese Application No. 202080104427.X, mailed on Aug. 15, 2024, 22 pages.
Communication pursuant to Article 94(3) EPC issued in corresponding European Application No. 20955780.0, dated Jul. 3, 2024, 6 pages.
Second Office Action issued in corresponding Chinese Application No. 202080104427.X, mailed Jan. 27, 2025, 14 pages.
Communication pursuant to Article 94(3) EPC issued in corresponding European Application No. 20955780.0, mailed on Feb. 6, 2025, 8 pages.
Third Office Action issued in corresponding Chinese Application No. 202080104427.X, mailed on May 1, 2025, 15 pages.

\* cited by examiner

100
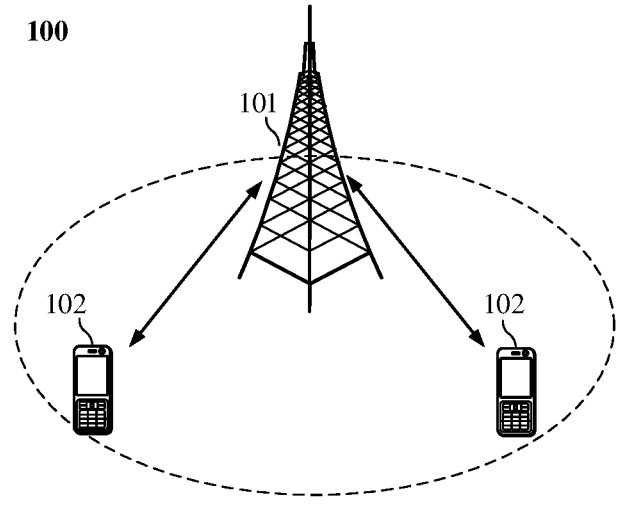
FIG. 1
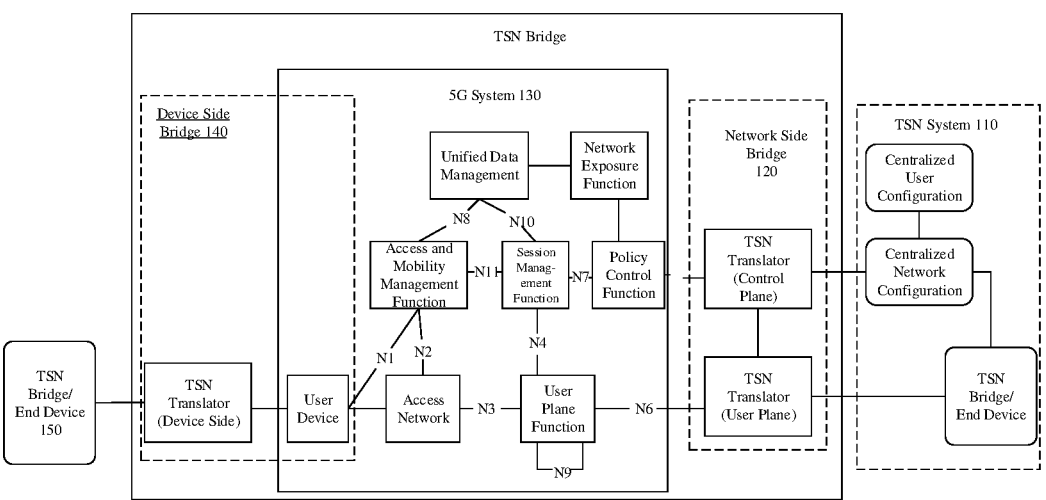
FIG. 2
200
| A terminal device executes a related operation for propagation delay compensation (PDC) in the case that a first PDC execution condition is satisfied | S210 |
FIG. 3

Terminal Device    Network Device

S301, determine first PDC execution condition is satisfied

S302, first request message

S303, perform relation operation of PDC

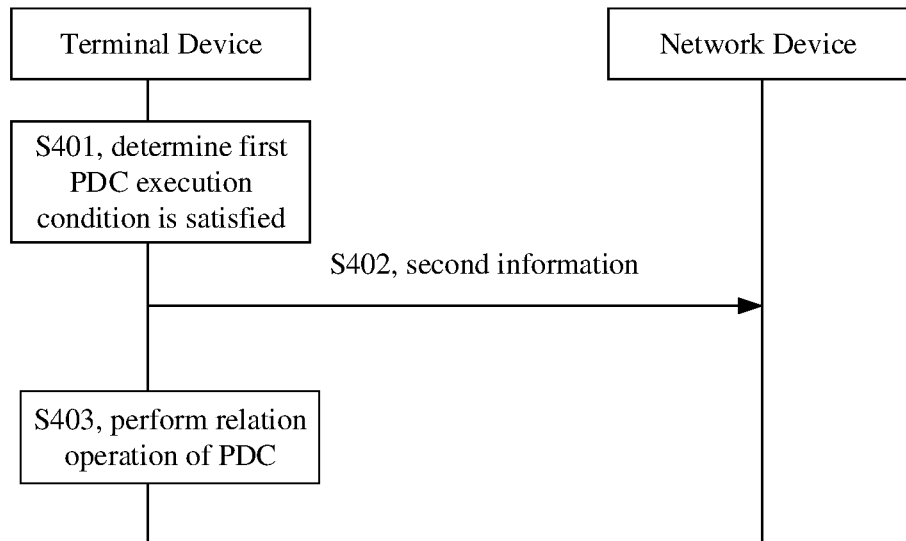
FIG. 6
500
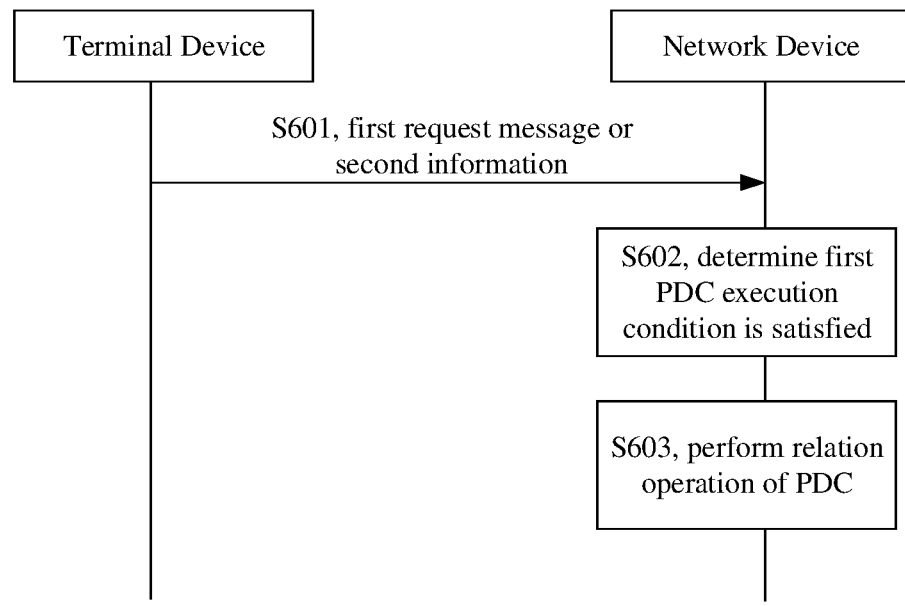
FIG. 7
FIG. 8

WIRELESS COMMUNICATION METHOD, TERMINAL DEVICE, AND NETWORK DEVICE

CROSS-REFERENCE TO RELATED APPLICATION

This application is a continuation of PCT application No. PCT/CN2020/119649, filed Sep. 30, 2020, entitled "WIRELESS COMMUNICATION METHOD, TERMINAL DEVICE, AND NETWORK DEVICE," which is hereby incorporated by reference in its entirety.

TECHNICAL FIELD

Embodiments of this application relate to the field of communications, and in particular, to a wireless communication method, a terminal device, and a network device.

BACKGROUND

A concept of time sensitive network (TSN) has been introduced in the industrial Internet of things (IIoT) system for supporting transmission of services including factory automation, transport industry, electrical power distribution and the like through 5G system. In the TSN system, the communication system acts as a TSN bridge to provide services of clock synchronization and service transmission for nodes in the TSN system. Therefore, the communication system needs to provide lower delay guarantee and higher clock synchronization accuracy. Specifically, it may need to meet the time synchronization accuracy requirement of less than 900 ns. How to achieve high-precision time synchronization between terminals and the network by performing propagation delay compensation (PDC) is an urgent problem to be solved.

SUMMARY

Embodiments of this application provide a wireless communication method, a terminal device, and a network device, which are conducive to realizing high-precision time synchronization between the terminal and the network.

In a first aspect, a method of wireless communication is provided, including: performing, by a terminal device, a related operation used for propagation delay compensation (PDC) in response to that a first PDC execution condition is satisfied.

In a second aspect, a method of wireless communication is provided, including: performing, by a network device, a related operation used for PDC in response to that a second PDC execution condition is satisfied.

In a third aspect, a terminal device is provided for performing the method according to the first aspect or any possible embodiment thereof. Specifically, the terminal device includes a unit for performing the method according to the first aspect or any possible embodiment thereof.

In a fourth aspect, a network device is provided for performing the method according to the second aspect or any possible embodiment thereof. Specifically, the network device includes a unit for performing the method according to the second aspect or any possible embodiment thereof.

In a fifth aspect, a terminal device is provided and includes: a processor and a memory. The memory is configured to store a computer program, and the processor is configured to invoke and run the computer program stored in the memory to perform the method according to the first aspect or any embodiment thereof.

In a sixth aspect, a network device is provided and includes: a processor and a memory. The memory is configured to store a computer program, and the processor is configured to invoke and run the computer program stored in the memory to perform the method according to the second aspect or any embodiment thereof.

In a seventh aspect, a chip is provided for performing the method according to any one of the first aspect and the second aspect as described above or any embodiment thereof.

Specifically, the chip includes: a processor configured to invoke and run a computer program from a memory, causing a device installed with the chip to perform the method according to any one of the first aspect and the second aspect as described above or any embodiment thereof.

In an eighth aspect, a computer-readable storage medium is provided for storing a computer program, and the computer program causes a computer to perform the method according to any one of the first aspect and the second aspect as described above or any embodiment thereof.

In a ninth aspect, a computer program product is provided, including computer program instructions, where the computer program instructions cause a computer to perform the method according to any one of the first aspect and the second aspect as described above or any embodiment thereof.

In a tenth aspect, there is provided a computer program which, when run on a computer, causes the computer to perform the method according to any one of the first aspect and the second aspect as described above or any embodiment thereof.

Based on the above technical solutions, the PDC can be triggered by the terminal device. In this way, the terminal device can execute the PDC process, or send auxiliary information for determining the PDC to the network device, which is beneficial for the terminal device to execute the PDC at an appropriate time, thereby achieving accurate synchronization between the terminal device and the network device. Alternatively, the PDC can be trigged by the network device, so that network device can execute the PDC at an appropriate time, thereby achieving accurate synchronization between the terminal device and the network device.

BRIEF DESCRIPTION OF THE DRAWINGS

FIG. 1 is a schematic diagram of an application scenario according to some embodiments of this application.

FIG. 2 is a network architecture diagram of a TSN network where a 5G network acts as a TSN bridge.

FIG. 3 is a schematic diagram of a wireless communication method according to some embodiments of this application.

FIG. 4 to FIG. 6 are schematic interaction diagrams of the wireless communication method according to some embodiments of this application.

FIG. 7 is a schematic block diagram of a terminal device according to some embodiments of this application.

FIG. 8 is a schematic interaction diagram of the wireless communication method according to some embodiments of this application.

DETAILED DESCRIPTION

Figures 4, 5:
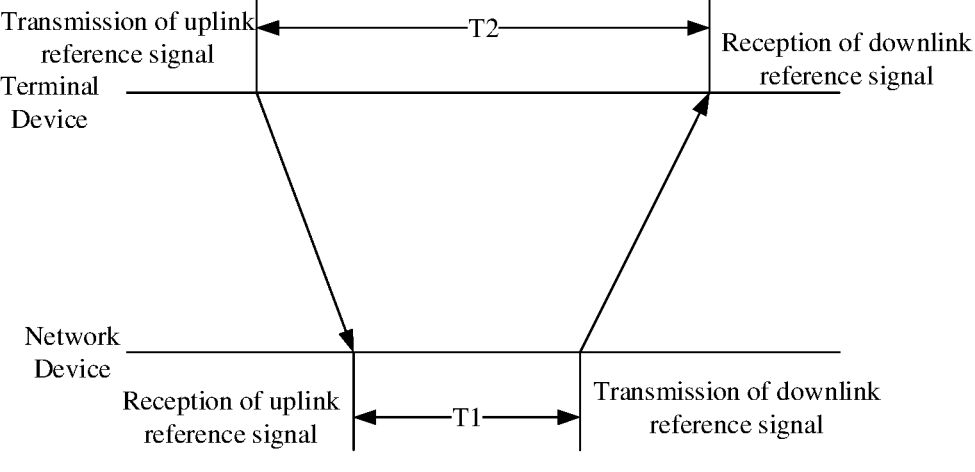

The technical solutions in the embodiments of this application will be described below with reference to the accompanying drawings according to the embodiments of this application. Obviously, the described embodiments are part of the embodiments of this application, not all of them. With regard to the embodiments in this application, all other embodiments obtained by those skilled in the art without creative efforts shall fall within the protection scope of this application.

The technical solutions of the embodiments of this application may be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems.

Generally speaking, traditional communication systems support a limited number of connections and are easy for implementation. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication. The embodiments of this application may also be applied to these communication systems.

Optionally, the communication system in some embodiments of this application may be applied to a carrier aggregation (CA) scenario, a dual connectivity (DC) scenario, or a standalone (SA) networking scenario.

Optionally, the communication system in some embodiments of this application may be applied to an unlicensed spectrum, where the unlicensed spectrum may also be considered as a shared spectrum. Alternatively, the communication system in some embodiments of this application may also be applied to a licensed spectrum, where the licensed spectrum may also be considered unshared spectrum.

In this application, various embodiments are described in conjunction with the network device and terminal device, where the terminal device may also be referred to as user equipment (UE), access terminal, subscriber unit, subscriber station, mobile station, mobile site, remote station, remote terminal, mobile device, user terminal, terminal, wireless communication device, user agent, user device, or the like.

The terminal device may be a station (ST) in the WLAN, a cellular phone, a cordless phone, a Session Initiation Protocol (SIP) phone, a Wireless Local Loop (WLL) station, a personal digital processing (PDA) device, a handheld device with wireless communication capabilities, a computing device or other processing devices connected to wireless modems, an in-vehicle device, a wearable device, or a terminal device in the next-generation communication system such as the NR network, or a terminal device in a future-evolved network of the public land mobile network (PLMN), or the like.

In some embodiments of this application, the terminal device may be deployed on land, including indoor or outdoor, handheld, wearable, or vehicle-mounted; or may also be deployed on water (such as ships, etc.); or may also be deployed in the air (such as airplanes, balloons, and satellites).

In some embodiments of this application, the terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example without limitation, in some embodiments of this application, the terminal device may also be a wearable device. Wearable devices may also be called wearable smart devices, which are the general term for the intelligent design of daily wear and the development of wearable devices using wearable technology, such as glasses, gloves, watches, clothing and shoes. Wearable device is a portable device that is worn directly on the body or integrated into the user's clothing or accessories. Wearable device is not only a hardware device, but also realizes powerful functions through software support, data interaction, and cloud interaction. In a general sense, wearable smart devices may be of full-feature, large-scale, with complete or partial functions without relying on smart phones, including such as smart watches or smart glasses; or may only focus on a certain type of application function, which needs to cooperate with other devices such as smart phones, including such as various smart bracelets, and smart jewelry for physical sign monitoring.

In some embodiments of this application, the network device may be a device for communicating with a mobile device. For example, the network device may be an access point (AP) in WLAN, or a base transceiver station (BTS) in GSM or CDMA, a NodeB (NB) in WCDMA, an evolutional Node B (eNB or eNodeB) in LTE, a relay station, an access point, an in-vehicle device, a wearable device, a network device (gNB) in NR network, a network device in the future-evolved PLMN network, a network device in NTN network, or the like.

As an example without limitation, in some embodiments of this application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Optionally, the network device may also be a base station provided in a location such as land or water.

In some embodiments of this application, the network device may provide services for a cell, and the terminal device communicates with the network device through transmission resources (for example, frequency domain resources, or spectrum resources) used by the cell. The cell may correspond to the network device (e.g., a base station), and the cell may belong to a macro base station, or a base station corresponding to a small cell. The small cell may include a metro cell, a micro cell, a pico cell, a femto cell, and the like. These small cells have the characteristics of small coverage and low transmission power, and are suitable for providing high-speed data transmission services.

Exemplarily, a communication system 100 to which some embodiments of this application are applied is shown in FIG. 1. The communication system 100 may include a network device 101, and the network device 101 may be a device that communicates with a terminal device 102 (or referred to as a communication terminal, a terminal). The network device 101 may provide communication coverage for a specific geographic area, and may communicate with terminal devices located within the coverage area.

FIG. 1 exemplarily shows one network device and two terminal devices. Optionally, the communication system 100 may include multiple network devices and the coverage of each network device may include other numbers of terminal devices. Embodiments of this application are not limited thereto.

Optionally, the communication system 100 may further include other network entities such as a network controller and a mobility management entity, which are not limited in some embodiments of this application.

It should be understood that, in some embodiments of this application, a device having a communication function in the network/system may be referred to as a communication device. Taking the communication system 100 shown in FIG. 1 as an example, the communication device may include a network device 101 and a terminal device 102 with communication function, and the network device 101 and the terminal device 102 may be the specific devices described above, which will not be repeated here. The communication device may also include other devices in the communication system 100, for example, other network entities such as a network controller, a mobility management entity, and the like, which are not limited in some embodiments of this application.

It should be understood that the terms "system" and "network" are often used interchangeably herein. The term "and/or" in this disclosure refers to only an association relationship for describing associated objects, indicating that there may be three kinds of relationships. For example, A and/or B may refer to three cases, A exists alone, A and B exist at the same time, and B exists alone. In addition, the character "/" in this disclosure generally indicates that the related objects are in an "or" relationship.

It should be understood that the "indication" mentioned in some embodiments of this application may be a direct indication, an indirect indication, or an associated relationship. For example, if A indicates B, it may represent that A directly indicates B, for example, B may be obtained through A; it may also represent that A indicates B indirectly, such as A indicates C, and B may be obtained through C; it may also represent that there is an association relation between A and B.

In the description of some embodiments of this application, the term "corresponding" may indicate that there is a direct or indirect corresponding relationship between two objects, or may indicate that there is an associated relationship between the objects. The relationship may also include indicating and being indicated, configuring and being configured.

In some embodiments of this application, the concept of time sensitive network (TSN) or time sensitive control (TSC) has been introduced in the industrial Internet of things (IIoT) system for supporting transmission of services including factory automation, transport industry, electrical power distribution and the like through 5G system. In the TSN system, the communication system acts 100 as a TSN bridge to provide services of clock synchronization and service transmission for nodes in the TSN system. Therefore, the communication system 100 needs to provide lower delay guarantee and higher clock synchronization accuracy.

FIG. 2 is a network architecture diagram of a TSN network where a 5G network acts as a TSN bridge. The network architecture includes a TSN system 110, a network side bridge 120, a 5G system 130, a device side bridge 140 and a TSN bridge/end device 150.

The TSN system 110 includes: a centralized user configuration (CUC), a centralized network configuration (CNC) and at least one TSN bridge or end device. The TSN system 110 is connected to the network side bridge 120.

The network side bridge 120 includes: a control plane TSN translator and a user plane TSN translator. The control plane TSN translator is acted by the application function (AF), which is in communication connection with the centralized network configuration in the TSN system 110. The user plane TSN translator is in a communication connection with the TSN bridge or end device in the TSN system 110.

The 5G system 130 includes: a core network, a radio access network (RAN), and a terminal. The user plane of the core network includes user plane function (UPF); the control plane of the core network includes unified data management (UDM), network exposure function (NEF), access and mobility management function (AMF) entity, session management function (SMF), and policy control function (PCF).

Herein, N1 interface is a reference point between the terminal and AMF; N2 interface is a reference point between RAN and AMF, which is used for sending NAS messages; N3 interface is a reference point between RAN and UPF, which is used for transmitting user plane data; N4 interface is a reference point between SMF and UPF, which is used for transmitting information such as tunnel identification information of N3 connection, data buffer indication information, and downlink data notification messages; N6 interface is a reference point between UPF and user plane TSN translator, which is used for transmitting the user plane data; N8 is a reference point between UDM and AMF; N10 is a reference point between UDM and SMF; and N11 is a reference point between AMF and SMF.

The device side bridge 140 has a communication connection with the terminal in the 5G system 130. The device side bridge 140 includes a device side TSN translator. The device side bridge 140 also has a communication connection with the TSN bridge/end device 150.

According to FIG. 2, in the TSN network, the 5G system 130 is a path for transmitting TSN services, so the 5G system needs to support the transmission of TSN services and the time synchronization requirements of the TSN network, thereby enabling the services to be transmitted within the required time. In view of this, the 5G system 130 needs to provide lower delay guarantee and higher clock synchronization accuracy, so that when industrial automation services are transmitted in the 5G network, the operation and subsequent operation of each point of the mechanical operation are accurate, all in line with the time requirements.

In the 5G system, the TSN time is obtained through a reference time information field (referenceTimeInfo-r16) in the system information block (SIB) signaling. The reference time information field includes system frame number (SFN) information, absolute time information, and the like, with an indication accuracy of 10 ns.

Based on the requirements of TSN service transmission, when TSN services are transmitted in 5G, it needs to meet the time synchronization accuracy requirement of less than 900 ns. Therefore, how to perform the propagate delay compensation (PDC) process to achieve high-accuracy time synchronization between the terminal and the network is an urgent problem to be solved.

FIG. 3 is a schematic flowchart of a wireless communication method 200 according to some embodiments of this application. The method 200 may be performed by the terminal device in the communication system shown in FIG. 1. As shown in FIG. 3, the method 200 may include at least some of the following contents.

In S210, the terminal device performs a related operation used for PDC in response to that a first PDC execution condition is satisfied.

Optionally, in some embodiments of this application, the terminal device may be a terminal in any state, for example, an idle state, a connected state, or an inactive state.

Optionally, in some embodiments, whether the first PDC execution condition is satisfied may be determined according to information such as requirements, capabilities of the terminal device, or an indication of the network device.

Optionally, the requirements of the terminal device may include, but are not limited to, at least one of the following: whether the terminal device requires high time accuracy; whether it needs to transmit TSN services; whether there is a requirement for a generalized precision time protocol (gPTP message); whether the time synchronization information of the terminal device has changed (if yes, in a sense, there is a need to perform PDC); whether the location of the terminal device has changed significantly (if yes, then the propagation delay between the terminal device and the network may vary, therefore, there may also be a need to perform PDC); whether a protocol data unit (PDU) session corresponding to specific services (e.g., delay sensitive services, such as ultra-reliable and low latency communication (URLLC) service) of the terminal device is established (if yes, it may be considered that there is a need to perform PDC); whether a PDU session corresponding to specific slices (e.g., a slice that supports delay sensitive services, such as URLLC service) is established (if yes, it may be considered that there is a need to perform PDC); whether the terminal device has uplink data to be transmitted; or the like.

Optionally, the capabilities of the terminal device may include, but are not limited to, at least one of the following: the capability to support high precision time or high time precision, support TSN services, support the transmission of gPTP messages, support the transmission of specific services, such as URLLC services, support specific slices, or the like.

The indication of the network device may include an explicit indication. For example, the network device may send first indication information to the terminal device, indicating the terminal device to perform the related operation of PDC. Alternatively, the indication may also include an implicit indication. For example, the network device may send to the terminal device assistance information or configuration information used for performing PDC; in this case, the terminal device may consider that the PDC execution condition is satisfied, or there is a need to perform the PDC.

It should be understood that, in some embodiments of this application, the terminal device may also determine whether the PDC execution condition is satisfied according to other information, and this application is not limited thereto.

As an example without limitation, the first PDC execution condition includes at least one of the following:
the terminal device is a specific terminal;
the terminal device receives time information for time synchronization, or time information used for time synchronization of the terminal device is updated;
location information of the terminal device satisfies a preset condition;
the terminal device receives first indication information from the network device, where the first indication information is used for triggering the terminal device to perform the related operation used for PDC;
first information sent by the network device is received, where the first information is used for assisting in determining a PDC value.

Optionally, in some embodiments, when referring to that the terminal device is the specific terminal, it includes at least one of the following:
the terminal device is a terminal requiring high precision;
the terminal device is a terminal supporting TSN services;
the terminal device is a terminal transmitting gPTP messages;
the terminal device is a terminal supporting high precision time;
the terminal device is a terminal capable of supporting transmission of TSN services;
the terminal device is a terminal capable of supporting transmission of gPTP messages;
a PDU session corresponding to a specific service has been established on the terminal device;
a PDU session corresponding to a specific slice has been established on the terminal device;
the terminal device has no data to be transmitted within a first duration;
uplink data arrives at the terminal device;
the terminal device has established a connection with the network device.

Optionally, in some embodiments, when referring to that the terminal device receives time information for time synchronization, it may include, for example, that the terminal device receives an SIB 9.

The SIB9 may include reference information for time synchronization, such as absolute time information, and the absolute time information may be an absolute time relative to a certain system frame number (SFN), such as a time point at a certain year, a certain month, a certain day, a certain hour, a certain minute, a certain second, a certain millisecond, and the like.

In some other embodiments, when referring to that the terminal device receives time information for time synchronization, it may include, for example, that the terminal device receives a downlink information transfer message (DLinformationtransfer). The downlink information transfer message may include reference information for time synchronization. For example, it includes absolute time information, and the absolute time information may be an absolute time relative to a certain SFN, such as a time point at a certain year, a certain month, a certain day, a certain hour, a certain minute, a certain second, a certain millisecond, and the like.

In some other embodiments, the information used for time synchronization may also be carried in other messages, and this application is not limited thereto. When the terminal device receives the information used for time synchronization, it may be considered that the PDC execution condition is satisfied, and the execution of PDC related operations may be further triggered. When the time information used for time synchronization of the terminal device is updated, it may be considered that time alignment needs to be performed again. In this case, it may be considered that the PDC execution condition is satisfied, and further, the execution of the related operations of PDC may be triggered.

As an example without limitation, when referring to that the time information used for time synchronization of the terminal device is updated, it includes at least one of the following situations:

the terminal device receives first time information, where the first time information is different from second time information, and the second time information is time information received last time before the first time information is received;

a clock of the terminal device is updated, and a time interval, from a last clock synchronization of the terminal device to when the clock is updated, is greater than or equal to a first threshold;

an accumulated clock error of the terminal device is greater than or equal to a second threshold;

a clock update period of the terminal device is reached;

a PDC period of the terminal device is reached.

Optionally, the first threshold may be determined according to a crystal oscillator precision, and the crystal oscillator precision may be, for example, parts per million (PPM).

Optionally, the second time information is sent through at least one of the following signaling: SIB9, and the downlink information transfer message. The second time information may also be information used for time synchronization. The difference between the first time information and the second time information indicates that the reference time has changed. In this case, it may be considered that clock synchronization is required, and correspondingly the execution of PDC is required.

Optionally, when referring to that the location information of the terminal device satisfies the preset condition, it indicates that the location of the terminal device is changed and may cause any situation where PDC needs to be performed. For example, it may include but not limited to, the location update of the terminal device occurs, and a distance between the terminal device and the network device is greater than or equal to a third threshold. For example, the terminal device moves out of a certain cell, or move out of a certain area, or the like. For another example, a path loss between the terminal device and the current cell is greater than or equal to a certain threshold, or a measurement result of the terminal device on the current cell is less than or equal to a certain threshold. For another example, the path loss between the terminal device and the neighboring cell is less than or equal to a certain threshold, or the measurement result of the terminal device on the neighboring cell is greater than or equal to a certain threshold. Optionally, the measurement result mentioned here may include, but is not limited to, reference signal receiving power (RSRP), reference signal receiving quality (RSRQ), signal to interference plus noise ratio (SINR), or the like.

In some embodiments of this application, the first indication information may be transmitted through at least one of radio resource control (RRC) signaling, media access control (MAC) control element (CE), downlink control information (DCI).

Optionally, the first information may include any information used in the process of PDC (Propagate Delay Compensation). For example, the first information may be used for determining the amount of transmission delay compensation in the PDC process.

Optionally, in some embodiments, the PDC may be determined based on the manner of receive-transmit (RX-TX) positioning. As shown in FIG. 4, the round trip time (RTT) between the terminal device and the network device may be determined by sending and receiving reference signals.

Specifically, the terminal device may send an uplink reference signal to the network device, and the network device may receive the uplink reference signal sent by the terminal device. Further, the network device may send a downlink reference signal to the terminal device, and the terminal device may receive the downlink reference signal sent by the network device. Accordingly, the network device may determine the first time interval information T1 based on the receiving time of the uplink reference signal and the sending time of the downlink reference signal, and the terminal device may determine the second time interval information T2 based on the sending time of the uplink reference signal and the receiving time of the downlink reference signal.

Optionally, in some embodiments, the first information may include the first time interval information T1 and reference time information corresponding to the first time interval information T1.

Optionally, the reference time information may be, for example, absolute time, such as a time point at a certain year, a certain month, a certain day, a certain hour, a certain minute, a certain second, a certain millisecond; or other time identifiers, such as a time slot sequence number, an SFN sequence number, and the like.

Optionally, in other embodiments, the PDC may be determined based on a timing advance (TA). In this case, the first information may include the TA.

In some embodiments, the first information may also include a PDC value determined by the network device. In other words, the network device may directly send the PDC value to the terminal device.

As an example, the PDC value may be determined according to the first time interval information T1 and the second time interval information T2, for example, the PDC value is $(T2-T1)/2$ or $(T1-T2)/2$.

As another example, the PDC value may be determined according to the TA, for example, the PDC value is TA/2.

To sum up, the first information includes at least one of the following:

first time interval information, where the first time interval information is determined according to the receiving time of the uplink reference signal and the sending time of the downlink reference signal;

sending time information of the downlink reference signal;

receiving time information of the uplink reference signal;

the PDC value determined by the network device;

the TA determined by the network device.

It should be understood that the above-mentioned specific content of the first information is only an example, and other auxiliary information used in the PDC process may be included in practical applications, and this application is not limited thereto.

The possible implementation of the first PDC execution condition is described above, and the following describes related operations for PDC that may be performed by the terminal device when the first PDC execution condition is satisfied.

In some embodiments, when the first PDC execution condition is satisfied, the terminal device performs at least one of the following:

sending a first request message to the network device, where the first request message is used for triggering the network device to perform the related operation of PDC;

sending second information to the network device, where the second information is used for assisting the network device in determining the PDC value;

performing the PDC process.

Optionally, in some embodiments, the first request message is used for triggering the network device to perform at least one of the following:

sending first configuration information to the terminal device, where the first configuration information is used for configuring information for determining the PDC value;

sending the first information to the terminal device, where the first information is used for assisting the terminal device in determining the PDC value;

performing the PDC process.

Optionally, the first request message is sent through at least one of RRC message, MAC CE, and uplink control information (UCI).

Optionally, the RRC message may be, for example, an RRC connection establishment request, an RRC resume request, or other dedicated RRC messages, which is not limited in this application.

In some embodiments, a terminal device in the idle state may indicate, through a cause value (cause) in the RRC connection establishment request, that the RRC connection establishment request includes the first request message.

In some embodiments, a terminal device in the inactive state may indicate, through a cause value (cause) in the RRC resume request, that the RRC resume request includes the first request message.

In some embodiments, a terminal device in the connected state may indicate, through a specific information element (IE) in another dedicated RRC message, that the first request message is included in the RRC message.

Optionally, the first configuration information may include any configuration information for performing PDC, which is not limited in this application.

As an example, in order to determine the PDC value based on RX-TX, the network device may configure the terminal device with a reference signal used for determining the PDC, for example, the downlink positioning reference signal (PRS) and/or the sounding reference signal (SRS). Alternatively, it may also be other uplink or downlink reference signals, which are not limited here. Accordingly, the terminal device and the network device may perform signal measurement based on the reference signal, and determine the aforementioned first time interval T1 or second time interval T2 or PDC value according to the measurement result.

As an example, in order to determine the PDC value based on the TA, the network device may configure the terminal device with information for determining the PDC, for example, a preamble or an uplink SRS. Accordingly, the terminal device and the network device may perform the random access procedure, or send and receive SRS based on the above information, so as to further determine the PDC value.

Optionally, the second information sent by the terminal device to the network device includes at least one of the following:

second time interval information, where the second time interval information is determined according to a sending time of uplink reference signal and a receiving time of downlink reference signal;

sending time information of the uplink reference signal;

receiving time information of the downlink reference signal;

the PDC value determined by the terminal device.

To sum up, in case that the first PDC execution condition is satisfied, the terminal device may send the first request message to the network device to trigger the network device to perform the related operations of PDC, or may also send to the network device auxiliary information used for performing PDC, or perform the PDC process by itself.

Optionally, performing the PDC process by the terminal device may include, for example, that the terminal device determines the PDC value according to the first information and/or the second information, and performs propagation delay compensation.

With reference to FIG. 5 and FIG. 6, a method for wireless communication according to some embodiments of this application is described from the perspective of interaction between devices.

As shown in FIG. 5, at least some of the following steps may be included.

In S301, the terminal device determines that the first PDC execution condition is satisfied.

For the specific implementation, the foregoing related description may be referred to, which will not be repeated here.

In S302, in response to that the first PDC execution condition is satisfied, the terminal device sends the first request message to the network device, where the first request message is used for triggering the network device to perform the related operation used for PDC.

Correspondingly, the network device receives the first request message sent by the terminal device.

Further, in S303, the network device performs the related operation used for PDC.

For example, the first configuration information is sent to the terminal device, or the first information is sent to the terminal device, or the PDC procedure is performed. For the process of performing the PDC by the network device, reference may be made to the related implementation of the terminal device performing the PDC, and details are not repeated here.

In some embodiments, the execution process of the PDC is triggered by the terminal device. Specifically, the network device may be requested to obtain the relevant information used for PDC, for example, the first configuration information or the first information, which is conducive to obtaining the PDC value at an appropriate time, thereby achieving precise synchronization between the terminal device and the network device.

As shown in FIG. 6, at least some of the following steps may be included.

In S401, the terminal device determines that the first PDC execution condition is satisfied.

For the specific implementation, the foregoing related description may be referred to, which will not be repeated here.

In S402, in response to that the first PDC execution condition is satisfied, the terminal device sends second information to the network device, where the specific content of the second information may be understood by referring to the foregoing related description.

Optionally, in some embodiments, the second information may also be used for triggering the network device to perform the related operation used for the PDC, that is, the second information may be regarded as an implicit first request message. The network device may also perform the related operation of PDC based on the second information.

In other embodiments, in S403, the terminal device may also perform the PDC process in response to that the first PDC execution condition is satisfied.

In some embodiments, the process of PDC is triggered by the terminal device. Specifically, the terminal device may perform the PDC process, or send to the network device the auxiliary information used for determining the PDC, which is beneficial to perform the PDC at an appropriate time, so that the precise synchronization can be achieved between the terminal device and the network device.

FIG. 7 is a schematic flowchart of a method 500 for wireless communication according to some other embodiments of this application. The method 500 may be performed by the network device in the communication system shown in FIG. 1. As shown in FIG. 7, the method 500 includes following content.

In S510, the network device performs a related operation used for PDC under the condition that a second PDC execution condition is satisfied.

Optionally, in some embodiments of this application, the terminal device may be a terminal in any state, such as an idle state, a connected state, or an inactive state.

Optionally, in some embodiments of this application, whether the second PDC execution condition is satisfied may be determined according to information such as requirements, capabilities, and a current state of the terminal device.

Optionally, the requirements of the terminal device may include, but are not limited to, at least one of the following: whether the terminal device requires high time accuracy; whether it needs to transmit TSN services; whether there is a requirement for a generalized precision time protocol (gPTP message); whether the time synchronization information of the terminal device has changed (if yes, in a sense, there is a need to perform PDC); whether the location of the terminal device has changed significantly (if yes, then the propagation delay between the terminal device and the network may vary, therefore, there may also be a need to perform PDC); whether a protocol data unit (PDU) session corresponding to specific services (e.g., delay sensitive services, such as URLLC service) of the terminal device is established (if yes, it may be considered that there is a need to perform PDC); whether a PDU session corresponding to specific slices (e.g., a slice that supports delay sensitive services, such as URLLC service) is established (if yes, it may be considered that there is a need to perform PDC); whether the terminal device has uplink data to be transmitted; or the like.

Optionally, the capabilities of the terminal device may include, but are not limited to, at least one of the following: the capability to support high precision time or high time precision, support TSN services, support the transmission of gPTP messages, support the transmission of specific services, such as URLLC services, support specific slices, or the like.

The current state of the terminal device may include, for example, whether the current position of the terminal device is greatly changed, whether the time synchronization information of the terminal device is changed, or the like.

It should be understood that, in some embodiments of this application, the network device may also determine whether the PDC execution condition is satisfied according to other information, and this application is not limited thereto.

As an example without limitation, the second PDC execution condition includes at least one of the following:
a terminal device is a specific terminal;
time information used for time synchronization is sent to the terminal device, or time information used for time synchronization of the terminal device is updated;
location information of the terminal device satisfies a preset condition;
a first request message sent by the terminal device is received, where the first request message is used for triggering the network device to perform the related operation of PDC;
second information sent by the terminal device is received, wherein the second information is used for assisting the network device in determining a PDC value.

Optionally, in some embodiments, when referring to that the terminal device is the specific terminal, it includes at least one of the following:
the terminal device is a terminal requiring high precision;
the terminal device is a terminal supporting TSN service;
the terminal device is a terminal transmitting gPTP messages;
the terminal device is a terminal supporting high precision time;
the terminal device is a terminal capable of supporting transmission of the TSN service;
the terminal device is a terminal capable of supporting transmission of the gPTP messages;
a PDU session corresponding to a specific service has been established on the terminal device;
a PDU session corresponding to a specific slice has been established on the terminal device;
the terminal device has no data to be transmitted within a first duration;
uplink data arrives at the terminal device;
the terminal device has established a connection with the network device.

Optionally, in some embodiments, the sending the time information for time synchronization to the terminal device may include, for example, sending a system information block (SIB) 9 to the terminal device. The SIB9 may include reference information for time synchronization, such as absolute time information, which may be an absolute time relative to a certain SFN, such as a time point at a certain year, a certain month, a certain day, a certain hour, a certain minute, a certain second, a certain millisecond, and the like.

In other embodiments, the sending the time information for time synchronization to the terminal device may include, for example, sending a downlink information transfer (DLinformationtransfer) message to the terminal device. The message may include reference information for time synchronization. For example, it includes absolute time information, and the absolute time information may be an absolute time relative to a certain SFN, such as a time point at a certain year, a certain month, a certain day, a certain hour, a certain minute, a certain second, a certain millisecond, and the like.

In other embodiments, the information for time synchronization may also be sent to the terminal device through other messages or signaling, but this application is not limited thereto.

As an example without limitation, when referring to that the time information used for time synchronization of the terminal device is updated, it includes at least one of the following situations:

the network device sends first time information to the terminal device, where the first time information is different from the second time information, and the second time information is time information sent before the first time information;

a clock of the terminal device is updated, and a time interval, from a last clock synchronization of the terminal device to when the clock is updated, is greater than or equal to a first threshold;

an accumulated clock error of the terminal device is greater than or equal to a second threshold;

a clock update period of the terminal device is reached;

a PDC period of the terminal device is reached.

Optionally, the first threshold may be determined according to a crystal oscillator precision, and the crystal oscillator precision may be, for example, parts per million (PPM).

Optionally, the second time information is sent through at least one of the following signaling: SIB9, and the downlink information transfer message. The second time information may also be information used for time synchronization. The difference between the first time information and the second time information indicates that the reference time has changed. In this case, it may be considered that clock synchronization is required, and correspondingly the execution of PDC is required.

Optionally, when referring to that the location information of the terminal device satisfies the preset condition, it indicates that the location of the terminal device is changed and may cause any situation where PDC needs to be performed. For example, it may include but not limited to, the location update of the terminal device occurs, and a distance between the terminal device and the network device is greater than or equal to a third threshold. For example, the terminal device moves out of a certain cell, or move out of a certain area, or the like. For another example, a path loss between the terminal device and the current cell is greater than or equal to a certain threshold, or a measurement result of the terminal device on the current cell is less than or equal to a certain threshold. For another example, the path loss between the terminal device and the neighboring cell is less than or equal to a certain threshold, or the measurement result of the terminal device on the neighboring cell is greater than or equal to a certain threshold. Optionally, the measurement result mentioned here may include, but is not limited to, RSRP, RSRQ, SINR, or the like.

The possible implementation of the second PDC execution condition is described above, and the following describes the related operation used for PDC that the network device may perform when the second PDC execution condition is satisfied.

In some embodiments, when the second PDC execution condition is satisfied, the network device performs at least one of the following:

sending first configuration information to the terminal device, where the first configuration information is used for configuring information for determining the PDC value;

sending first configuration information to the terminal device, where the first configuration information is used for configuring information for determining the PDC value;

sending first information to the terminal device, where the first information is used for assisting the terminal device in determining the PDC value;

sending first indication information to the terminal device, where the first indication information is used for triggering the terminal device to perform the related operation used for the PDC;

performing a PDC process.

In some embodiments, specific implementations of the first request message, the first configuration information, the first information, and the second information may refer to the relevant implementations in the foregoing embodiments, which are not repeated here for brevity.

With reference to FIG. 8, a wireless communication method according to some embodiments of this application is described from the perspective of device interaction.

As shown in FIG. 8, at least some of the following steps may be included.

In S602, the network device determines that the second PDC execution condition is satisfied.

For the specific implementation, the foregoing related description may be referred to, which will not be repeated here.

In some embodiments, in S601, the network device receives the first request message or the second information sent by the terminal device. In this case, the network device may consider that the second PDC execution condition is satisfied.

Further, in S603, the network device may perform the related operation used for PDC.

For example, the first configuration information is sent to the terminal device, the first indication information is sent to the terminal device, the first information is sent to the terminal device, the PDC process is performed, or the like.

In some embodiments, the process of triggering the PDC is determined by the network device, so that the network device may perform PDC at an appropriate timing to achieve precise synchronization between the terminal device and the network device.

The method embodiments of this application are described in detail above with reference to FIG. 3 to FIG. 8, and the device embodiments of this application will be described in detail below with reference to FIG. 9 to FIG. 13. It should be understood that the device embodiments and the method embodiments correspond to each other, and similar description may refer to the method embodiments.

Figure 9:
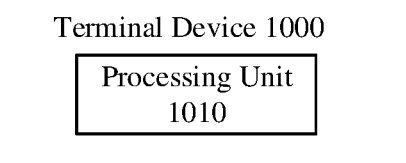
FIG. 9 is a schematic block diagram of a terminal device according to some embodiments of this application.

FIG. 9 shows a schematic block diagram of a terminal device 1000 according to some embodiments of this application. As shown in FIG. 9, the terminal device 1000 includes a processing unit.

The processing unit 1010 is configured to perform a related operation used for PDC in response to that a first PDC execution condition is satisfied.

Optionally, in some embodiments, the first PDC execution condition includes at least one of following:

the terminal device is a specific terminal;

the terminal device receives time information for time synchronization, or time information used for time synchronization of the terminal device is updated;

location information of the terminal device satisfies a preset condition;

the terminal device receives first indication information from a network device, where the first indication information is used for triggering the terminal device to perform the related operation used for PDC;

first information sent by the network device is received, where the first information is used for assisting in determining a PDC value.

Optionally, in some embodiments, the terminal device is the specific terminal including at least one of following:

the terminal device is a terminal requiring high precision;

the terminal device is a terminal supporting TSN service;

the terminal device is a terminal transmitting a gPTP message;

the terminal device is a terminal supporting high precision time;

the terminal device is a terminal capable of supporting transmission of the TSN service;

the terminal device is a terminal capable of supporting transmission of the gPTP message;

a PDU session corresponding to a specific service has been established on the terminal device;

a PDU session corresponding to a specific slice has been established on the terminal device;

the terminal device has no data to be transmitted within a first duration;

uplink data arrives at the terminal device;

the terminal device has established a connection with the network device.

Optionally, in some embodiments, the time information used for time synchronization of the terminal device is updated includes at least one of following:

the terminal device receives first time information, where the first time information is different from second time information, and the second time information is time information received last time before the first time information is received;

a clock of the terminal device is updated, and a time interval, from a last clock synchronization of the terminal device to when the clock is updated, is greater than or equal to a first threshold;

an accumulated clock error of the terminal device is greater than or equal to a second threshold;

a clock update period of the terminal device is reached;

a PDC period of the terminal device is reached.

Optionally, in some embodiments, the first time information is sent through at least one of following signaling: a SIB9, a downlink information transfer message.

Optionally, in some embodiments, the second time information is sent through at least one of following signaling: a SIB9, a downlink information transfer message.

Optionally, in some embodiments, the first threshold is determined according to a crystal oscillator precision.

Optionally, in some embodiments, the location information of the terminal device satisfies the preset condition includes: a location of the terminal device is updated, and a distance between the terminal device and the network device is greater than or equal to a third threshold.

Optionally, in some embodiments, the first indication information is sent through at least one of following signaling: RRC signaling, MAC CE, DCI.

Optionally, in some embodiments, performing, by the first device, the related operation used for PDC in response to that the first PDC execution condition is satisfied includes:

performing, by the terminal device, at least one of following in response to that the first PDC execution condition is satisfied:

sending a first request message to the network device, where the first request message is used for triggering the network device to perform the related operation of PDC;

sending second information to the network device, where the second information is used for assisting the network device in determining the PDC value;

performing a PDC process.

Optionally, in some embodiments, the first request message is used for triggering the network device to perform at least one of following:

sending first configuration information to the terminal device, where the first configuration information is used for configuring information for determining the PDC value;

sending the first information to the terminal device, where the first information is used for assisting the terminal device in determining the PDC value;

performing the PDC process.

Optionally, in some embodiments, the first configuration information is used for configuring at least one of following:

a reference signal used for determining the PDC;

a random access preamble used for determining the PDC.

Optionally, in some embodiments, the second information includes at least one of following:

second time interval information, where the second time interval is determined according to a sending time of uplink reference signal and a receiving time of downlink reference signal;

sending time information of the uplink reference signal;

receiving time information of the downlink reference signal;

the PDC value determined by the terminal device.

Optionally, in some embodiments, the first information includes at least one of following:

first time interval information, where the first time interval information is determined according to a receiving time of uplink reference signal and a sending time of downlink reference signal;

sending time information of the downlink reference signal;

receiving time information of the uplink reference signal;

the PDC value determined by the network device;

a TA determined by the network device.

Optionally, in some embodiments, the above-mentioned communication unit may be a communication interface or a transceiver, or an input/output interface of a communication chip or a system-on-chip. The aforementioned processing unit may be one or more processors.

It should be understood that the terminal device 1000 according to some embodiments of this application may correspond to the terminal device in the method embodiments of this application, and the above-mentioned and other operations and/or functions of each unit in the terminal device 1000 are for the purpose of implementing processes corresponding to the terminal device in the method as shown in FIG. 3 to FIG. 6, respectively, which will not be repeated here for the sake of brevity.

Figure 10:
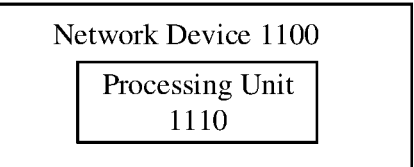
FIG. 10 is a schematic block diagram of a network device according to some embodiments of this application.

FIG. 10 is a schematic block diagram of a network device according to some embodiments of this application. The network device 1100 of FIG. 10 includes a processing unit.

The processing unit 1110 is configured to perform a related operation used for PDC in response to that a second PDC execution condition is satisfied. In some embodiments, the second PDC execution condition includes at least one of following:

a terminal device is a specific terminal;

time information used for time synchronization is sent to the terminal device, or time information used for time synchronization of the terminal device is updated;

location information of the terminal device satisfies a preset condition;

a first request message sent by the terminal device is received, where the first request message is used for triggering the network device to perform the related operation of PDC;

second information sent by the terminal device is received, where the second information is used for assisting the network device in determining a PDC value.

Optionally, in some embodiments, the terminal device is the specific terminal including at least one of following:

the terminal device is a terminal requiring high precision;

the terminal device is a terminal supporting TSN service;

the terminal device is a terminal transmitting a gPTP message;

the terminal device is a terminal supporting high precision time;

the terminal device is a terminal capable of supporting transmission of the TSN service;

the terminal device is a terminal capable of supporting transmission of the gPTP message;

a PDU session corresponding to a specific service has been established on the terminal device;

a PDU session corresponding to a specific slice has been established on the terminal device;

the terminal device has no data to be transmitted within a first duration;

uplink data arrives at the terminal device;

downlink data arrives at the terminal device;

the terminal device has established a connection with the network device.

Optionally, in some embodiments, the time information used for time synchronization of the terminal device is updated includes at least one of following:

the network device sends first time information to the terminal device, where the first time information is different from second time information, and the second time information is time information sent last time before the first time information;

a clock of the terminal device is updated, and a time interval, from a last clock synchronization of the terminal device to when the clock is updated, is greater than or equal to a first threshold;

an accumulated clock error of the terminal device is greater than or equal to a second threshold;

a clock update period of the terminal device is reached;

a PDC period of the terminal device is reached.

Optionally, in some embodiments, the first time information is sent through at least one of following signaling: a SIB9, a downlink information transfer message.

Optionally, in some embodiments, the second time information is sent through at least one of following signaling: a SIB9, a downlink information transfer message.

Optionally, in some embodiments, the first threshold is determined according to a crystal oscillator precision.

Optionally, in some embodiments, the location information of the terminal device satisfies the preset condition includes:

a location of the terminal device is updated, and a distance between the terminal device and the network device is greater than or equal to a third threshold.

Optionally, in some embodiments, the first request message is used for triggering the network device to perform at least one of following:

sending first configuration information to the terminal device, where the first configuration information is used for configuring information for determining the PDC value;

sending the first information to the terminal device, where the first information is used for assisting the terminal device in determining the PDC value;

performing the PDC process.

Optionally, in some embodiments, the second information includes at least one of following:

second time interval information, where the second time interval information is determined according to a sending time of uplink reference signal and a receiving time of downlink reference signal;

sending time information of the uplink reference signal;

receiving time information of the downlink reference signal;

the PDC value determined by the terminal device.

Optionally, in some embodiments, performing, by the network device, the related operation used for PDC in response to that the second PDC execution condition is satisfied includes:

performing, by the network device, at least one of following in response to that the second PDC execution condition is satisfied:

sending first configuration information to the terminal device, where the first configuration information is used for configuring information for determining the PDC value;

sending first information to the terminal device, where the first information is used for assisting the terminal device in determining the PDC value;

sending first indication information to the terminal device, where the first indication information is used for triggering the terminal device to perform the related operation used for the PDC;

performing a PDC process.

Optionally, in some embodiments, the first configuration information is used for configuring at least one of following:

a reference signal used for determining the PDC;

a random access preamble used for determining the PDC.

Optionally, in some embodiments, the first information includes at least one of following:

first time interval information, where the first time interval information is determined according to a receiving time of uplink reference signal and a sending time of downlink reference signal;

sending time information of the downlink reference signal;

receiving time information of the uplink reference signal;

the PDC value determined by the network device;

a TA determined by the network device.

Optionally, in some embodiments, the first indication information is sent through at least one of following signaling:

radio resource control (RRC) signaling, medium access control (MAC) control element (CE), downlink control information (DCI).

Optionally, in some embodiments, the above-mentioned communication unit may be a communication interface or a transceiver, or an input/output interface of a communication chip or a system-on-chip. The aforementioned processing unit may be one or more processors.

It should be understood that the network device 1100 according to the embodiments of this application may correspond to the network device in the method embodiments of this application, and the above-mentioned and other operations and/or functions of each unit in the network device 1100 are for the purpose of implementing processes corresponding to the network device in the method as shown in FIG. 7 or FIG. 8, respectively, which will not be repeated here for the sake of brevity.

Figure 11:
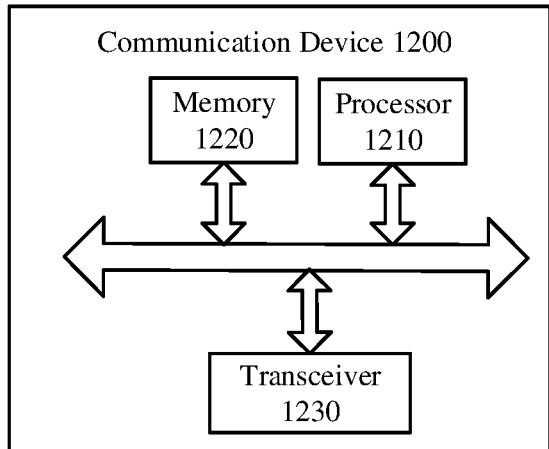
FIG. 11 is a schematic block diagram of a communication device according to some other embodiments of this application.

FIG. 11 is a schematic block diagram of a communication device 1200 according to some embodiments of this application. The communication device 1200 shown in FIG. 11 includes a processor 1210, and the processor 1210 may call and run a computer program from a memory, so as to implement the methods in the embodiments of this application.

Optionally, as shown in FIG. 11, the communication device 1200 may further include a memory 1220. The processor 1210 may call and run the computer program from the memory 1220 to implement the methods in the embodiments of this application.

The memory 1220 may be a separate device independent of the processor 1210, or may be integrated in the processor 1210.

Optionally, as shown in FIG. 11, the communication device 1200 may further include a transceiver 1230, and the processor 1210 may control the transceiver 1230 to communicate with other devices, specifically, may send information or data to other devices, or receive information or data sent by other devices.

In some embodiments, the transceiver 1230 may include a transmitter and a receiver. The transceiver 1230 may further include antennas, and the number of the antennas may be one or more.

Optionally, the communication device 1200 may specifically be the network device according to some embodiments of this application, and the communication device 1200 may implement the corresponding processes implemented by the network device in each method according to some embodiments of this application. For brevity, details are not repeated here.

Optionally, the communication device 1200 may specifically be a mobile terminal/terminal device according to some embodiments of this application, and the communication device 1200 may implement the corresponding processes implemented by the mobile terminal/terminal device in each method according to some embodiments of this application. For brevity, details are not repeated here.

Figure 12:
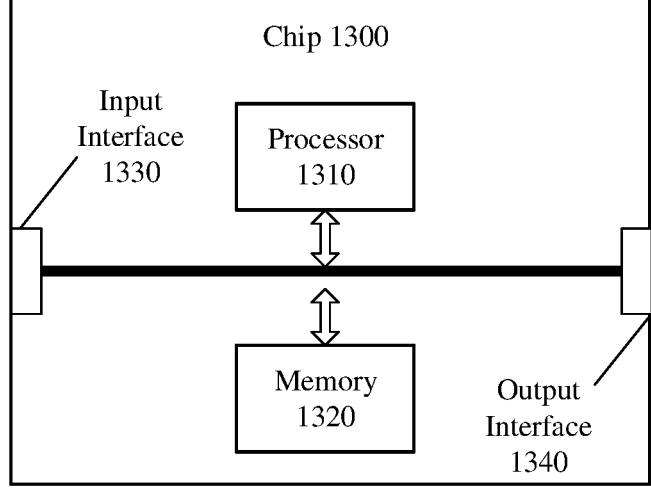
FIG. 12 is a schematic block diagram of a chip according to some embodiments of this application.

FIG. 12 is a schematic block diagram of a chip according to some embodiments of this application. The chip 1300 shown in FIG. 12 includes a processor 1310, and the processor 1310 may call and run a computer program from a memory to implement the method according to some embodiments of this application.

Optionally, as shown in FIG. 12, the chip 1300 may further include a memory 1320. The processor 1310 may call and run the computer program from the memory 1320 to implement the methods in the embodiments of this application.

The memory 1320 may be a separate device independent of the processor 1310, or may be integrated in the processor 1310.

Optionally, the chip 1300 may further include an input interface 1330. The processor 1310 may control the input interface 1330 to communicate with other devices or chips, and specifically, may obtain information or data sent by other devices or chips.

Optionally, the chip 1300 may further include an output interface 1340. The processor 1310 may control the output interface 1340 to communicate with other devices or chips, and specifically, may output information or data to other devices or chips.

Optionally, the chip may be applied to the network device according to some embodiments of this application, and the chip may implement the corresponding processes implemented by the network device in each method according to some embodiments of this application, which is not repeated here for brevity.

Optionally, the chip may be applied to the mobile terminal/terminal device according to some embodiments of this application, and the chip may implement the corresponding processes implemented by the mobile terminal/terminal device in each method according to some embodiments of this application, which is not repeated here for brevity.

It should be understood that the chip mentioned in the embodiments of this application may also be referred to as a system-level chip, a system chip, a chip system, a system-on-a-chip, or the like.

Figure 13:
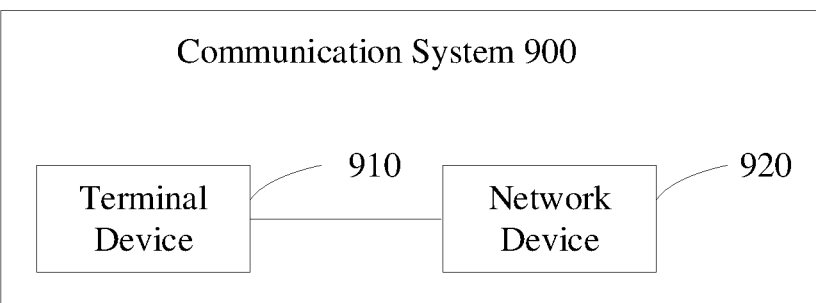
FIG. 13 is a schematic block diagram of a communication system according to some embodiments of this application.

FIG. 13 is a schematic block diagram of a communication system 900 according to some embodiments of this application. As shown in FIG. 13, the communication system 900 includes a terminal device 910 and a network device 920.

The terminal device 910 may be configured to implement the corresponding functions implemented by the terminal device in the above method, and the network device 920 may be configured to implement the corresponding functions implemented by the network device in the above method. For brevity, details are not repeated here.

It should be understood that the processor in some embodiments of this application may be an integrated circuit chip, which has a signal processing capability. In some embodiments, each step of the above method embodiments may be completed by a hardware integrated logic circuit in a processor or an instruction in the form of software. The above-mentioned processor may be a general-purpose processor, a digital signal processor (DSP), an application specific integrated circuit (ASIC), a field programmable gate array (FPGA) or other available programming logic devices, discrete gate or transistor logic devices, discrete hardware components, thereby implementing or performing the methods, steps, and logic block diagrams disclosed in the embodiments of this application. The general purpose processor may be a microprocessor or may be any conventional processor or the like. The steps of the method disclosed in conjunction with the embodiments of this application may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage medium well known in the art. The storage medium is located in the memory, and the processor reads the information in the memory, and completes the steps of the above method in combination with its hardware.

It may be understood that the memory in some embodiments of this application may be a volatile memory or a non-volatile memory, or may include both volatile and non-volatile memory. In some embodiments, the non-volatile memory may be a read-only memory (ROM), a programmable ROM (PROM), an erasable PROM (EPROM), an electrically EPROM (EEPROM) or flash memory. The volatile memory may be a random access memory (RAM), which acts as an external cache. By way of illustration without limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM)) and direct Rambus RAM (DR RAM). It should be noted that the memory of the systems and methods described herein is intended to include, but not be limited to, these and any other suitable types of memory.

It should be understood that the above memory is an example but not a limitative description. For example, the memory in the embodiment of this application may also be a static RAM (SRAM), a dynamic (DRAM), a synchronous DRAM (SDRAM), a double data rate SDRAM (DDR SDRAM), an enhanced SDRAM (ESDRAM), a synch link DRAM (SLDRAM), a direct Rambus RAM (DR RAM), or the like. In other words, the memory in the embodiments of this application is intended to include but not limited to these and any other suitable types of memory.

Embodiments of this application further provide a computer-readable storage medium for storing a computer program.

Optionally, the computer-readable storage medium may be applied to the network device in the embodiments of this application, and the computer program enables the computer to execute the corresponding processes implemented by the network device in the various methods according to some embodiments of this application, which is not repeated here for brevity.

Optionally, the computer-readable storage medium may be applied to the mobile terminal/terminal device in the embodiments of this application, and the computer program enables the computer to execute the corresponding processes implemented by the mobile terminal/terminal device in each method according to some embodiments of this application, which is not repeated here for brevity.

Embodiments of this application also provide a computer program product, including computer program instructions.

Optionally, the computer program product may be applied to the network device in the embodiments of this application, and the computer program instructions cause the computer to execute the corresponding processes implemented by the network device in each method according to some embodiments of this application, which is not repeated here for brevity.

Optionally, the computer program product may be applied to the mobile terminal/terminal device in the embodiments of this application, and the computer program instructions cause the computer to execute the corresponding processes implemented by the mobile terminal/terminal device in each method according to some embodiments of this application, which is not repeated here for brevity.

Embodiments of this application also provide a computer program.

Optionally, the computer program may be applied to the network device in the embodiments of this application. When the computer program is run on the computer, it causes the computer to execute the corresponding processes implemented by the network device in each method according to some embodiments of this application, which is not repeated here for brevity.

Optionally, the computer program may be applied to the mobile terminal/terminal device in the embodiments of this application, and when the computer program is run on the computer, the mobile terminal/terminal device implements corresponding processes implemented by the network device in each method according to some embodiments of this application, which is not repeated here for brevity.

Those of ordinary skill in the art may realize that the units and algorithm steps of each example described in conjunction with the embodiments disclosed herein may be implemented in electronic hardware, or a combination of computer software and electronic hardware. Whether these functions are performed in hardware or software depends on the specific application and design constraints of the technical solution. Those of ordinary skill in the art may implement the described functionality using different methods for each particular application, but such implementations should not be considered beyond the scope of this application.

Those skilled in the art may clearly understand that, for the convenience and brevity of description, the specific working process of the above-described systems, devices and units may refer to the corresponding processes in the foregoing method embodiments, which will not be repeated here.

In the several embodiments provided in this application, it should be understood that the disclosed system, device and method may be implemented in other manners. For example, the device embodiments described above are only illustrative. For example, the division of the units is only a logical function division. In actual implementation, there may be other division manners. For example, multiple units or components may be combined or may be integrated into another system, or some features may be ignored, or not implemented. On the other hand, the shown or discussed mutual coupling or direct coupling or communication connection may be through some interfaces, indirect coupling or communication connection of devices or units, and may be in electrical, mechanical or other forms.

The units described as separate components may be or may not be physically separated, and components displayed as units may be or may not be physical units, that is, may be located in one place, or may be distributed to multiple network units. Some or all of the units may be selected according to actual needs to achieve the purpose of the solution in some embodiments.

In addition, each functional unit in various embodiments of this application may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the technical solution of this application in essence, or the part that contributes to the prior art or the part of the technical solution may be embodied in the form of a software product. The computer software product is stored in a storage medium, including several instructions causing a computer device (which may be a personal computer, a server, or a network device, or the like) to implement all or part of the steps of the methods described in the various embodiments of this application. The aforementioned storage medium includes: U disk, mobile hard disk, read-only memory (ROM), random access memory (RAM), magnetic disk, optical disk and other medium that may store program codes.

The above are only specific embodiments of this application, but the protection scope of this application is not limited thereto. Those skilled in the art can easily think of changes or substitutions within the technical scope disclosed in the application, which should be covered within the protection scope of this application. Therefore, the protection scope of the present application should be based on the protection scope of the claims.

What is claimed is:

1. A method of wireless communication, comprising:

performing, by a terminal device, a related operation used for propagation delay compensation (PDC) in response to determining that a first PDC execution condition is satisfied, wherein the first PDC execution condition comprises a clock of the terminal device is updated, and a time interval, from a last clock synchronization of the terminal device to when the clock is updated, is greater than or equal to a first threshold; and wherein performing the related operation comprises performing a PDC process based on a PDC value determined based on first time interval information and second time interval information, the first time interval information is determined based on a receiving time of an uplink reference signal and a sending time of a downlink reference signal, and the second time interval information is determined based on a sending time of the uplink reference signal and a receiving time of the downlink reference signal.

2. The method as claimed in claim 1, wherein the first PDC execution condition further comprises at least one of following:

the terminal device is a specific terminal;

location information of the terminal device satisfies a preset condition;

the terminal device receives first indication information from a network device, wherein the first indication information is used for triggering the terminal device to perform the related operation used for PDC; and first information sent by the network device is received, wherein the first information is used for assisting in determining the PDC value.

3. The method as claimed in claim 2, wherein the first indication information is sent through at least one of following signaling:

radio resource control (RRC) signaling, medium access control (MAC) control element (CE), downlink control information (DCI).

4. The method as claimed in claim 2, wherein performing the related operation further comprises:

performing, by the terminal device, at least one of following in response to determining that the first PDC execution condition is satisfied:

sending a first request message to the network device, wherein the first request message is used for triggering the network device to perform the related operation of PDC;

sending second information to the network device, wherein the second information is used for assisting the network device in determining the PDC value.

5. The method as claimed in claim 2, wherein the first information comprises at least one of following:

the first time interval information;

the sending time information of the downlink reference signal;

the receiving time information of the uplink reference signal;

the PDC value determined by the network device; and a time advance (TA) determined by the network device.

6. A terminal device, comprising a processor and a memory, wherein the memory is configured to store a computer program, and the processor is configured to invoke and run the computer program stored in the memory to:

perform a related operation used for propagation delay compensation (PDC) in response to determining that a first PDC execution condition is satisfied, wherein the first PDC execution condition comprises a clock of the terminal device is updated, and a time interval, from a last clock synchronization of the terminal device to when the clock is updated, is greater than or equal to a first threshold; and wherein the related operation comprises performing a PDC process based on a PDC value determined based on first time interval information and second time interval information, the first time interval information is determined based on a receiving time of an uplink reference signal and a sending time of a downlink reference signal, and the second time interval information is determined based on a sending time of the uplink reference signal and a receiving time of the downlink reference signal.

7. The terminal device as claimed in claim 6, wherein the first PDC execution condition further comprises at least one of following:

the terminal device is a specific terminal;

location information of the terminal device satisfies a preset condition;

the terminal device receives first indication information from a network device, wherein the first indication information is used for triggering the terminal device to perform the related operation used for PDC; and first information sent by the network device is received, wherein the first information is used for assisting in determining the PDC value.

8. The terminal device as claimed in claim 7, wherein the first indication information is sent through at least one of following signaling:

radio resource control (RRC) signaling, medium access control (MAC) control element (CE), downlink control information (DCI).

9. The terminal device as claimed in claim 7, wherein the processor is further configured to:

perform at least one of following in response to determining that the first PDC execution condition is satisfied:

sending a first request message to the network device, wherein the first request message is used for triggering the network device to perform the related operation of PDC;

sending second information to the network device, wherein the second information is used for assisting the network device in determining the PDC value.

10. The terminal device as claimed in claim 7, wherein the first information comprises at least one of following:

the first time interval information;

the sending time information of the downlink reference signal;

the receiving time information of the uplink reference signal;

the PDC value determined by the network device; and a time advance (TA) determined by the network device.

11. A network device, comprising a processor and a memory, wherein the memory is configured to store a computer program, and the processor is configured to invoke and run the computer program stored in the memory to:

perform a related operation used for propagation delay compensation (PDC) in response to determining that a first PDC execution condition is satisfied, wherein the first PDC execution condition comprises a clock of the terminal device is updated, and a time interval, from a last clock synchronization of the terminal device to when the clock is updated, is greater than or equal to a first threshold; and wherein the related operation comprises performing a PDC process based on a PDC value determined based on first time interval information and second time interval information, the first time interval information is determined based on a receiving time of an uplink reference signal and a sending time of a downlink reference signal, and the second time interval information is determined based on a sending time of the uplink reference signal and a receiving time of the downlink reference signal.

12. The network device as claimed in claim 11, wherein the first PDC execution condition further comprises at least one of following:

a terminal device is a specific terminal;

location information of the terminal device satisfies a preset condition;

a first request message sent by the terminal device is received, wherein the first request message is used for triggering the network device to perform the related operation of PDC; and second information sent by the terminal device is received, wherein the second information is used for assisting the network device in determining the PDC value.

13. The network device as claimed in claim 12, wherein the second information comprises at least one of following:

the second time interval information;

the sending time information of the uplink reference signal;

the receiving time information of the downlink reference signal; and the PDC value determined by the terminal device.

14. The network device as claimed in claim 11, wherein the processor is further configured to:

perform at least one of following in response to determining that the first PDC execution condition is satisfied:

sending first configuration information to the terminal device, wherein the first configuration information is used for configuring information for determining the PDC value;

sending first information to the terminal device, wherein the first information is used for assisting the terminal device in determining the PDC value;

sending first indication information to the terminal device, wherein the first indication information is used for triggering the terminal device to perform the related operation used for the PDC.

15. The network device as claimed in claim 14, wherein the first indication information is sent through at least one of following signaling:

radio resource control (RRC) signaling, medium access control (MAC) control element (CE), downlink control information (DCI).

* * * * *